United States Patent [19]

Decker et al.

[11] Patent Number: 5,260,038
[45] Date of Patent: Nov. 9, 1993

[54] GAS GENERATOR FOR AIR BAGS WITH CIRCUMFERENTIALLY DISPOSED BLADES

[75] Inventors: Hans J. Decker, Wiesbaden; Hans U. Freund, Bad Homburg; Karl-Heinz Grünthaler, Usingen; Helmut Heide, Kelkheim; Klaus Hollenberg, Bad Homburg; Hubert Preis, Darmstadt; Karl J. Rowold, Friedrichsdorf; Ralf G. Tschulena, Wehrheim, all of Fed. Rep. of Germany

[73] Assignee: Daicel Chemical Industries, Ltd., Tokyo, Japan

[21] Appl. No.: 865,361

[22] Filed: Apr. 8, 1992

[51] Int. Cl.⁵ .................................................. B01J 7/00
[52] U.S. Cl. .................................. 422/305; 280/736; 280/742; 422/165
[58] Field of Search ............... 422/305, 165, 166, 167; 280/742, 736, 740, 741

[56] References Cited

U.S. PATENT DOCUMENTS

| | | | |
|---|---|---|---|
| 3,532,360 | 10/1970 | Leising et al. | 280/150 |
| 3,618,980 | 11/1971 | Leising et al. | 280/150 |
| 3,632,132 | 1/1972 | Haas | 280/150 |
| 3,985,076 | 10/1976 | Schneiter | 102/39 |
| 4,278,638 | 7/1981 | Nilsson et al. | 422/166 |
| 4,296,084 | 10/1981 | Adams et al. | 423/151 |
| 4,530,516 | 7/1985 | Adams et al. | 280/735 |
| 4,547,342 | 10/1985 | Adams et al. | 422/166 |
| 4,561,675 | 12/1985 | Adams et al. | 280/734 |
| 4,578,247 | 5/1986 | Bolleau | 422/165 |
| 4,590,041 | 5/1986 | Hill | 422/165 |
| 4,722,551 | 2/1988 | Adams | 280/736 |
| 4,943,086 | 7/1990 | Cunningham | 280/741 |
| 5,106,119 | 4/1992 | Swann et al. | 280/736 |

FOREIGN PATENT DOCUMENTS

| | | | |
|---|---|---|---|
| 47-30045 | 11/1972 | Japan . | |
| 50-16057 | 6/1975 | Japan . | |
| 63-301144 | 12/1988 | Japan . | |
| 9201589 | 2/1992 | Japan | 280/736 |

Primary Examiner—Robert J. Warden
Assistant Examiner—Laura E. Collins
Attorney, Agent, or Firm—Weingram & Zall

[57] ABSTRACT

The present invention provides a gas generator for air bags that includes a first shell having a circular part and an outer wall. The outer wall is formed of a porous material which allows gas to pass freely therethrough. A second shell is attached to the first shell to form a housing into which is installed a gas generating device. A plurality of first and second blade members fasten the first and second shells together. The blade members are placed in contact with the circumferential surface of the canister and arranged along the circumference of the canister at periodic intervals to form a ring. The second blade members have a width at least equal to the circumferential interval between the first blade members and are spaced radially from the first blade members and shifted in the circumferential direction from the first blade members to positions facing the intervals between the first blade members. Gas is produced by the gas generating device, upon receiving impacts, delivered passed the blade members and introduced through the outer wall of the first shell, into the air bag to protect the passenger from an impact.

16 Claims, 2 Drawing Sheets

GAS GENERATOR FOR AIR BAGS WITH CIRCUMFERENTIALLY DISPOSED BLADES

BACKGROUND OF THE INVENTION

1. Field of the Invention

The present invention relates to a gas generator for air bags that protect passengers from impacts and more particularly to a novel shell structure of such a gas generator.

2. Prior Art

In conventional gas generators for air bags, a gas gene&ating device includes a canister filled with a gas generant. The canister is covered with a combustor cup on the outside which has a plurality of holes through which gases generated in the canister blow out. Because no means for control of the pressure or flow of gases is provided for, the combustor shells must be large and heavy and held together with rivets or the like. None of the previous patents, taken either singly or in combination, are thought to provide the benefits of the present invention.

U.S. Pat. No. 3,532,360 to Leising, et al, discloses a gas generating apparatus having a housing, a gas generating section, a coolant chamber, and an inflatable air bag. The housing is generally bowl shaped and includes a bottom wall and a side wall. The gas generator is separated from the air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the propellant towards the walls of the chamber in which they are positioned, causing the materials to travel in a generally circular pass, thereby enhancing combustion of the propellant. Because of their mass and velocity, reacting particles are kept in the chamber until fully consumed. The gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas also influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled through the peripheral orifices into an inflatable structure.

U.S. Pat. No. 4,296,084 to Adams et a, discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al, discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure for an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

OBJECTS AND SUMMARY OF THE INVENTION

Conventional gas generators are not equipped with a control means to control the pressure and flow of gases blowing out through the holes in the combustor chamber. To cope with high-pressure gases that burst out, the shell of the gas generator must be made thick. Further, it has been difficult to effectively remove solid matters contained in the gases by filters.

The gas generator of the present invention is configured to provide a means to control the pressure and flow of gases blowing out through the housing of the generator. The generator includes first and second blade members which hold together the gas generator and which are shaped and positioned to fit about a canister filled with gas generant. Adjacent to the first blade members are gas outlets which allow gas to blow out, and the second blades, which face the gas outlets, control the pressure or flow of gases bursting out of the gas outlets by causing a change in direction of the gas flow. The resulting energy loss allows the shells of the gas generator to be reduced in size and weight.

A gas generator for air bags according to this invention comprises: a first shell having its outer wall formed of a porous material; a second shell which, together with the first shell, forms a housing having a hollow portion; a gas generating device installed in the hollow portion, the gas generating device including a canister filled with a gas generant, the canister having a plurality of first and second blade members at least equal in height to the total height of the housing, the first blade members being shaped so as to fit the outer circumferential surface of the canister, the first blade members being placed in contact with the outer circumferential surface of the canister and arranged along the circumference of the canister at intervals along the circumferential direction, the second blade members having a width at least equal to the circumferential interval between the first blade members, the second blade members being spaced radially from the first blade members and shifted in the circumferential direction from the first blade members to positions facing the intervals between the first blade members; whereby gases produced by the gas generating device on receiving impacts are introduced from the outer wall of the first shell into the air bag to protect a passenger from impacts.

It is preferred that the first and second blade members each have projections at the axial ends thereof which engage with the first and second shells to join the first and second shells together and to fix the position of the blade members.

The first blade members are shaped as to fit the outer circumferential surface of the canister, and are arranged around the periphery of the canister at intervals in the circumferential direction. These blade members fixedly hold the canister and form a combustion chamber to accommodate the canister. Adjacent first blade members have intervals therebetween which form gas outlets. That is, between the adjacent first blade members the only barrier is the canister itself, so that the gases, when they blow out, break this portion of the canister.

The second blade members have a width at least equal to the interval between the first blade members and are located at positions facing the intervals formed by adjacent first blade members, i.e., the gas outlets, to control the pressure or flow of the gases bursting out from the gas outlets.

The first and second blade members function as stops for heavy molten material resulting from the explosion of the gas generant. Gas created during the explosion winds between the edges of the first and second blade members. However, the molten material is too heavy to make the turns made by the gases. Rather, the molten material travels outward of the combustion chamber until it impacts on one of the blade members where it is trapped.

The first shell has its outer wall formed of a porous material, which communicates the interior of the shell with the interior of the air bag. The gases after blowing past the first and second blade members, pass through the porous outer wall of the first shell and into the air bag to inflate the air bag.

It is therefore an object of this invention to provide a gas generator for air bags that eliminates the problems of the prior art.

It is another object of this invention to provide a gas generator for air bags that include blade members which cause an energy loss (pressure loss), which allows the shells of the gas generator to be made thinner, reducing the size and weight of the gas generator.

It is still another object of this invention to provide a gas generator for air bags that allows for the use of a press in the manufacture of the outer shell thereof.

It is even another object of this invention to provide a gas generator for air bags which requires a reduced number of parts.

It is yet another object of this invention to provide a gas generator for air bags which is relatively inexpensive to manufacture.

It is a further object of this invention to provide a gas generator for air bags wherein the shells comprising the housing may be crimped rather than welded together.

It is still a further object of this invention to provide a gas generator for air bags wherein blade members trap molten materials within the gas generator.

It is yet a further object of this invention to provide a gas generator wherein the blade members are the structural members that hold and support the housing.

BRIEF DESCRIPTION OF THE DRAWINGS

These and further objects of the present invention will become apparent to those skilled in the art from review of the following Detailed Description of the Invention and the accompanying drawings in which.

DETAILED DESCRIPTION OF THE INVENTION

Figure 2:
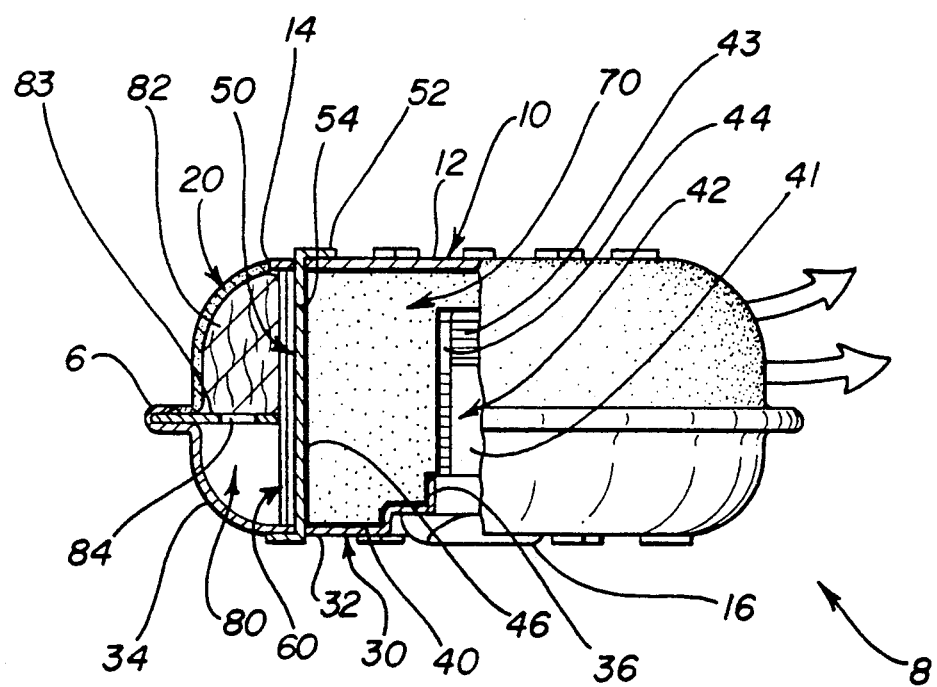
FIG. 2 is semi cross-sectional view of the gas generator of the present invention.

Referring first to FIG. 2, the housing of the gas generator, indicated generally at 8, of the present invention comprises a first shell or diffuser shell 10 and a second shell or a closure shell 30. The diffuser shell 10 has a circular part 12 and an outer wall 20 joined to the periphery 14 of the circular part 12. The circular part 12 is formed by any suitable means. Typically, it is formed of a pressed thin metal plate such as an aluminum alloy plate. The outer wall 20 with a curved surface, is preferably formed of a porous material such as "Celmet" (product name of Sumitomo Denko). "Celmet" is a sintered metal composed mainly of nickel which has a large number of fine holes, through which gases blow out. The outer wall 20 and the circular part 12 are joined together by an appropriate joining means, for example a bonding agent.

The closure shell 30 has a circular part 32 and an outer wall 34 formed along the outer periphery of the circular part. The circular part 32 and the outer wall 34 are formed by any suitable means. Typically, they are formed as one piece by pressing a thin metal plate such as an aluminum alloy plate. The diffuser shell 10 and the closure shell 30 are joined together by a crimped portion 6 of the closure shell 30 at the outer circumference of the housing and also by a plurality of blade members 30 to be described hereinafter.

A housing member 16 is fitted into a central hole portion 36 of the closure shell 30. The housing member 16 is a hollow member which forms an igniter chamber 42 inside. An opening 44 is provided to the upper part of the igniter chamber 42.

Figure 1:
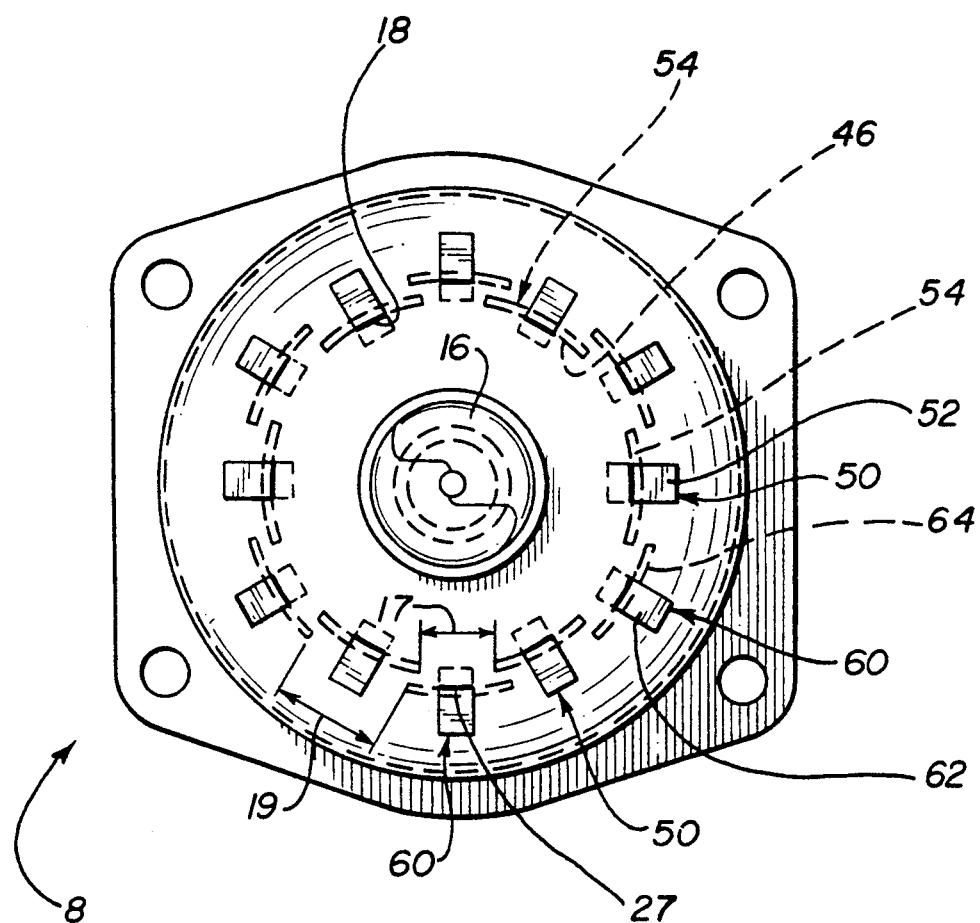
FIG. 1 is a bottom view of a gas generator of the present invention.

The housing member 16 is engaged with a canister 40, which is, typically, a thin (0.1–0.2 mm) aluminum canister filled with a gas generant. The canister 40 is fixed in position by a plurality of first blade members 50. Referring to FIG. 1, the first blade members 50 each have a rectangular wall portion 54, which is equal in height to the total height of the gas generator 8 and each have an inner surface 46 that fits the outer circumferential surface of the canister 40. The first blade members 50 also have projections 52 at the axial ends of the wall portion 54. The projections 52 pass through apertures 18 cut in the diffuser shell 10 and the closure shell 30 and are bent in opposite directions to engage with the outer surfaces of the diffuser shell 10 and the closure shell 30, respectively. The first blade members 50 are placed in contact with the outer surface of the canister 40 and are arranged at intervals 17 along the periphery of the canister 40 to form a combustion chamber 70 that accommodates the canister 40. The canister 40 in turn is held in the housing by blade members 50. Adjacent blade members form intervals 17 which serve as gas outlets.

The gases produced in the canister 40 are also controlled by a plurality of second blade members 60. The second blade members 60 each have a rectangular wall portion 64, which is as wide or slightly wider than the width of the interval 17 between adjacent first blade members 50. The second blade members 60 also have projections 62 at the axial ends thereof. The projections 62 pass through apertures 27 in the diffuser and closure shells and are bent in opposite directions to engage with the outer surfaces of the diffuser shell 10 and the closure shell 30. In this way, the first and second blade members are fixed to the diffuser shell and the closure shell by means of the projections. The diffuser shell and the closure shell, in turn, are joined together by the blade members. The second blade members 60 are spaced radially outward of a circular ring formed by the first blade members 50 and are also shifted in the circumferential direction from the first blade members 50 so that second blade members 60 face the intervals 17 forming gas outlets.

A filter chamber 80 is formed surrounding the outer side of the combustion chamber 70, beyond both rings of blades. In one embodiment, the filter chamber 80 includes a filter element 82 held in place by retainer 83 having a aperture 84 extending therethrough. In an alternative embodiment, filtering is performed by the first and second blade members in combination with the porous material of the outer wall 20 of diffuser shell 10.

The igniter chamber 42 contains a squib (igniter) 41 and an enhancer (transfer charge) 43. In the combustion chamber 70 is fixed the canister 40 filled with a gas generant.

When a sensor (not shown) is activated by an impact, the squib 41 is ignited to fire a transfer charge. The resulting high-pressure, high-temperature flame passes through the opening 44, breaking from the center into the canister 40 and firing the gas generant contained therein. The gases produced in the canister 40 break through the wall of the canister 40 at positions corresponding to the intervals 17 for gas outlet. The gases that have blown out strike the walls 64 of the second blade members 60 and then branch into left and right flows around second blade members 60. The right branch of gas flow blows against the left branch of gas flow from the rectangular part of the adjacent second blade member, producing a turbulence, which results in a loss of energy (pressure loss).

Part of the gases, after flowing past the second blade members 60 enter the filter 82 and the remaining gases enter the filter through the aperture 84 in the filter retainer 83. The gases are cleaned by the filter and then flow through the porous outer wall 20 of the first shell 10 out into the air bag (not shown). In another embodiment filtering is performed by the porous outer wall 20 of the diffuser shell 10.

The first and second blade members 50 and 60 cause an energy loss (pressure loss), which in turn allows the first and second shells 10 and 30 to be made thinner, resulting in a reduction of the size and weight of the gas generator. However, the rings formed by the first and second blade members, along with the circular parts of the diffuser and the closure, must be designed to be sufficiently strong to resist the pressure of combustion. The remaining portion of the housing may be of a low pressure design. This allows the use of a press for the manufacture of shells 10 and 30 and reduces the number of parts and cost of the manufacture of the generator.

One important aspect in the construction of the gas generator with a double ring of blades, is that it can forcibly change the gas flow to make use of most of the surface area of the filter and effectively remove solid substances from the gases.

The ring of first blade members 50 forms the combustion chamber 70 which accommodates the canister 40 and also works as a joining member to join the first and second shells 10 and 30 together. This obviates the need of a combustor cap or rivets.

Further, the fixing of the blade members and the joining together of the shells by the blade members can be done without welding. With the shells made thin, it is possible to crimp the outer circumference of the housing and therefore the shells can be joined together without welding. This simplifies the assembly process and contributes to improved safety during assembly.

Another advantage of this invention is that since the outer wall of the first shell is made of a porous material, the entire outer wall can be used as a gas outlet portion. This minimizes the pressure loss across the gas generator outlet.

It is important to note that in an alternative embodiment the blades 50 and 60 do not have to terminate in blade projections 52 and 62 but rather could terminate in rivet heads (not shown). The rivet heads would act to retain the first and second shells, 10 and 30, in a closed position and would further act to seal the apertures 18 in the first and second shells, 10 and 30, to prevent gas leakage therethrough.

Also, in related embodiments, there may be a plurality of third blade members (not shown) forming a third ring of blades. Such an embodiment would further provide for a labyrinth-type flow of gases generated, and result in an increased pressure loss across the blades. Further, additional rings of blades could be added to further alter the characteristic features of the gas generator. Likewise, the profiles of the blades could be altered to change the characteristics of the generator, i.e., the blades could be narrowed and one blade from a second ring of blades in connection with one blade from a third ring of blades could, in combination, be sized to at least equal in size the interval between adjacent first blade members. The positioning of the blades may be varied depending upon the numbers of blades involved, the rings of the blades, and the relative size of the blades.

Additionally, it should be noted that typically the gas generating reactants comprise sodium nitrate and copper. After the reaction, sodium hydroxide and copper (molten copper) are formed. Sodium nitrate ($NaN_3$) and copper oxide ($CuO_2$) react to form copper (Cu) and sodium hydroxide (NaOH) plus nitrogen (N). Nitrogen is the gas that fills the air bag. Sodium hydroxide is a toxic substance. The molten copper is toxic and harmful and it could melt the air bag if it released thereinto. Therefore, the advantage of the present invention is that the molten copper, being heavy, is directed against both the inner blades and outer blades and will hit either the inner blades or outer blades. The inner blades or outer blades will stop the molten copper, because the molten copper is too heavy to make a turn around the blades. Meanwhile, the nitrogen gas will flow through the blades in a labyrinth-like pattern.

Having thus described the invention in detail, it is understood that the foregoing description is not intended to limit the spirit and scope thereof. What is desired to be protected by Letters Patent is set forth in the appended claims.

What is claimed is:

1. A gas generator for air bags comprising:
   a first shell having a circular part and an outer wall, the outer wall being formed of a porous material;
   a second shell which, together with the first shell, forms a housing;
   a gas generating device installed in the housing, the gas generating device including a canister having an outer circumferential surface, the canister including a gas generant; and
   a plurality of first and second blade members at least equal in height to the total height of the housing;
   the first blade members positioned about the outer circumfernetial surface of the canister at intervals thereof;
   the second blade members having a width at least equal to the intervals between the first blade members;
   the second blade members being spaced radially from the first blade members and shifted in a circumferential direction from the first blade members to positions facing the intervals between the first blade members;
   the first and second blade members coact to form a flow path so that gases produced by the gas generating device flow past the first blade members and flow past the second blade members in a curved flow path to remove solid particulates of combustion and are introduced through the outer wall of the first shell into an air bag to inflate the air bag.

2. The apparatus of claim 1, wherein the first and second shells have outer surfaces and the first and second blade members each have projections at axial ends thereof which engage with the outer surfaces of the first and second shells to join the first and second shells together and fix the positions of the blade members.

3. The apparatus of claim 2 further including a filter chamber extending outwardly from the second blade members.

4. The apparatus of claim 3 wherein the filter chamber is separated by a partition with an aperture extending therethrough, one-half of the partition containing a filter element therein.

5. A gas generator for air bags comprising:
   a first shell;
   a second shell which, together with the first shell, forms a housing;
   a gas generating device installed in the housing, the gas generating device including a canister having an outer circumferential surface, the canister including a gas generant;
   a plurality of blade members arranged in at least two circumferential rings, the blade members at least equal in height to the total height of the housing;
   first blade members being arranged at circumferential intervals about the outer circumferential surface of the canister;
   second blade members being spaced radially outward from the first blade members and shifted in a circumferential direction from the first blade members to positions facing the intervals between adjacent blades of first blade members;
   projections at axial ends of the first and second blade members which extend through and engage with outer surfaces of the first and second shells to join the first and second shells together and fix the positions of the blade members.

6. The apparatus of claim 5 wherein the second blade members have a width at least equal to a circumferential distance between adjacent blade members of the first blade members.

7. The apparatus of claim 6 wherein the first shell has a circular part and an outer wall, the outer wall comprised of a porous material.

8. The apparatus of claim 5 further including a filter chamber extending radially outward from the second blade members.

9. The apparatus of claim 8 wherein the filter chamber is separated by a partition with an aperture extending therethrough, one-half of the partition containing a filter element therein.

10. The gas generator of claim 5 wherein the first and second shells are joined together by a crimped portion of one of the shells at an outer circumference of the housing.

11. A gas generator for air bags comprising:
a housing comprising:
a first shell comprising:
a circular part; and
an outer wall formed of a porous material for permitting the passing of a generated gas therethrough;
a second shell;
a gas generating device installed in the housing, the gas generating device including a canister filled with a gas generant;
retaining means for retaining the first shell together with the second shell, the retaining means comprising a plurality of blade members at least equal in height to the total height of the housing;
pressure reducing means within the housing for reducing the pressure of gas created upon explosion of the gas generant; and
filter means within the housing for filtering toxic and molten materials from the gas.

12. The apparatus of claim 11 wherein plurality of blade members comprises first and second blade members, the first blade members placed in contact with an outer circumferential surface of the canister and arranged along the outer circumferential of the canister at intervals along a circumferential direction.

13. The apparatus of claim 12 wherein the second blade members have a width at least as equal to the intervals along circumferential direction between the first blade members, the second blade members being spaced radially from the first blade members and shifted in the circumferential direction from the first blade members to positions facing the intervals between the first blade members.

14. The apparatus of claim 13, wherein the first and second blade members each have projections at axial ends thereof which engage with outer surfaces of the first and second shells to join the first and second shells together and fix the positions of the blade members.

15. The apparatus of claim 14 further including a filter chamber extending radially outward of the second blade members.

16. The apparatus of claim 15 wherein the filter chamber is separated by a partition with an aperture extending therethrough, one-half of the partition containing a filter element therein.

* * * * *